United States Patent [19]

Sakuramoto et al.

[11] Patent Number: 4,608,225

[45] Date of Patent: Aug. 26, 1986

[54] COMPOSITION FOR FIXING METAL POWDER MOLDING AT SINTERING

[75] Inventors: Takahumi Sakuramoto; Eishi Asoshina; Takashi Tominaga; Yukio Shimizu, all of Osaka; Tsuyoshi Morishita, Hiroshima; Sigemi Osaki, Hiroshima; Noriyuki Sakai, Hiroshima, all of Japan

[73] Assignees: Nitto Electric Industrial Co. Ltd.; Mazda Motor Corporation, both of Japan

[21] Appl. No.: 727,631

[22] Filed: Apr. 26, 1985

[30] Foreign Application Priority Data

Apr. 28, 1984 [JP] Japan ................................. 59-86918

[51] Int. Cl.⁴ ............................................ B22F 7/00
[52] U.S. Cl. .......................................... 419/5; 419/6;
419/7; 419/8; 419/36; 419/37; 419/57; 419/58;
156/308.2; 156/313; 228/196; 427/226;
428/551; 428/556; 428/625; 428/626
[58] Field of Search ....................... 419/5, 36, 8, 6, 37,
419/7, 57, 58; 428/551, 556, 625, 626; 228/196;
156/308.2, 313; 427/226

[56] References Cited

U.S. PATENT DOCUMENTS

| | | | |
|---|---|---|---|
| 4,017,570 | 4/1977 | Rice et al. | 419/26 |
| 4,335,494 | 6/1982 | Lemelson | 419/3 |
| 4,455,354 | 6/1984 | Dillon et al. | 419/27 |
| 4,491,558 | 1/1985 | Gardner | 419/27 |

Primary Examiner—Stephen J. Lechert, Jr.
Attorney, Agent, or Firm—Sughrue, Mion, Zinn, Macpeak and Seas

[57] ABSTRACT

A composition for fixing a metal powder molding at sintering, which is used, in the case of disposing a metal powder molding formed by rolling a mixture of a metal powder and a synthetic resin-based binder on a metal base material and sintering the metal powder molding in a non-oxidizing atmosphere, by interposing between the metal powder molding and the base material, comprising a thermosetting resin composition containing a thermosetting resin as the essential component, the amount of the residual carbon of which after the completion of sintering is at least about 0.5% by weight.

5 Claims, No Drawings

COMPOSITION FOR FIXING METAL POWDER MOLDING AT SINTERING

FIELD OF THE INVENTION

This invention relates to a fixing composition at sintering, which is used in the case of forming a metal layer on the surface of a metal base material for improving the abrasion resistance of the surface of the base material by disposing a metal powder molding comprising a sheet-like material or an analogous article thereof formed by rolling a mixture of the metal powder and a synthetic resin-based binder on the metal base material followed by sintering.

BACKGROUND OF THE INVENTION

When a metal powder sheet formed by rolling a mixture of the metal powder and a binder is placed on a metal base material and sintered for forming the metal layer thereon, the binder contained in the metal powder sheet, even if the binder has originally an adhesive action, is burned and volatilized off in the temperature raising stage for sintering to lose the adhesive strength whereby the adhesion between the metal powder sheet and the base material is lost. Thus, when the weight of the metal powder sheet acts on the adhesion face with the base material as the case of bonding the metal powder sheet to a slanting surface or a curved surface of the base material or a downward surface of the base material, the adhesive force of the binder cannot support the weight of the metal powder sheet, whereby the metal powder sheet peels off or falls from the base material. In particular, in the case of performing the sintering treatment of the metal powder which suffers vibration or impact during conveying in a furnace such as a mesh-belt type or pusher type continuous sintering furnace, a vacuum sintering furnace, etc., the metal powder sheet tends to peel off or fall due to the vibration or impact.

As an effective method for overcoming the above-described problem, the inventors already proposed a method of preventing the occurrence of peeling off or falling of the metal powder sheet even in the case of bonding the sheet to a metal base material in the specific state as described above or performing the sintering treatment as applying vibration or impact to the metal powder sheet by interposing a specific composition between the metal powder sheet and the metal base material in the case of disposing the sheet on the base material to assist the adhesion or fixing of the sheet to the base material until the above-described metal powder sheet is sintered (Japanese Patent Application No. 34887/84, corresponding to U.S. patent application Ser. No. 705,264, filed Feb. 25, 1985).

However, since the above-described composition for use in the previously proposed method is mainly composed of (meth)acrylic acid alkyl ester series polymer, a specific sintering operation that the sintering system is maintained at 250° to 380° C. for a definite period of time in the initial stage of temperature raising is required and the desired effect cannot be obtained without employing such a specific operation. Such a sintering operation is not always practical and is somewhat lacking in general industrial utilization.

SUMMARY OF THE INVENTION

As a result of various investigations from the above-described viewpoints, the inventors have succeeded to attain this invention.

Accordingly, an object of this invention is to provide a composition for fixing metal powder molding, which is used in the case of disposing a metal powder molding formed by rolling a mixture of a metal powder and a synthetic resin-based binder on a metal base material and sintering the metal powder molding in a non-oxidizing atmosphere, by interposing it between the metal powder molding and the base material, comprising a thermosetting resin composition containing a thermosetting resin as the essential component, the amount of residual carbon of which after the completion of sintering is at least about 0.5% by weight.

DETAILED DESCRIPTION OF THE INVENTION

When the above-described composition of this invention is interposed between the metal powder molding and the metal base material and the sintering treatment is performed at a definite temperature raising rate, the composition is first hardened in the initial temperature raising stage of usually from about 120° to 250° C. to assist the adhesion and fixing of the molding onto the base material by the strong adhesive force and further causes a thermal decomposition polycondensation reaction in subsequent temperature raising stage to form a carbon precursor, which exhibits the function of assisting the adhesion and fixing the molding onto the base material in the temperature range up to usually about 700° C. at which the molding begins to sinter. Therefore, even when the metal powder molding is placed on a slanting surface or a curved surface of the metal base material or is stuck to the downward surface of the base material, and the metal powder molding disposed on the base material is subjected to a sintering treatment in a state of applying vibration or impact to the molding during conveying in a sintering furnace, the use of the composition of this invention does not cause the problems of peeling off or falling of the metal powder molding during the sintering treatment.

Thus, by interposing the fixing composition of this invention between the metal powder molding and the metal base material, a desired metal layer strongly bonded to the base material by bonding of the metals each other of the metal base material and the metal powder can be formed without the specific sintering operation as required in the previous proposal, i.e., by applying the conventional sintering treatment employing a constant temperature raising rate and without causing the problem of peeling off or falling of the metal powder molding during the sintering treatment.

The most representative example of the thermosetting resin which can be used in this invention is an epoxy resin. Examples of the epoxy resin are a bisphenol A type epoxy resin having an epoxy equivalent of from about 100 to 5,000, an ether ester type epoxy resin, a novolak type epoxy resin, an ester type epoxy resin, an alicyclic type epoxy resin, a glycidyl ether type epoxy resin containing nitrogen, etc. Of those epoxy resins, a bisphenol A type epoxy resin is preferred.

As a hardening agent for an epoxy resin, a heat activative hardening agent which exhibits a hardening action by heating is used. In general, a hardening agent which is active in the temperature range of from about 80° to 200° C. is sufficiently used. Examples of the hardening agent which can be used are dicyandiamide, imidazoles, hydrazide compounds, urea derivatives, etc. The amount of the hardening agent is usually from about 1 to 15 parts by weight per 100 parts by weight of the epoxy resin.

As the thermosetting resin which can be used in this invention, thermosetting resins other than the above-described epoxy resins, such as phenol resins and unsaturated polyester resins can be also used. In this case, hardening agents may be selected according to the type of the thermosetting resin used. Also, a polyurethane resin comprising polyisocyanate and polyol as the constitutional materials may be used as the thermosetting resin. As the constitutional materials, modified materials such as acryl-modified polyisocyanate and an acryl-modified polyol may be used.

The fixing composition of this invention contains the above-described thermosetting resin as the essential component and may further contain, if desired and necessary, a conventional hardening agent; a hardening accelerator; a xylene resin, paraffin wax, process oil, abietyl alcohol, etc., as a softening agent; calcium carbonate, silica, talc, etc., as a filler; dioctyl phthalate, dioctyl adipate, triphenyl phosphate, dibutyl phthalate, etc., as a plasticizer; etc.

It is important in this invention that when the above-described composition composed of such constitutional components is interposed between a metal powder molding and a metal base material and the sintering treatment is performed, the amount of residual carbon after the completion of sintering is at least about 0.5% by weight, whereby the effect of this invention can be obtained. In other words, when the amount of residual carbon is less than about 0.5% by weight, the improvement of the adhesive and fixing force of the metal powder molding in heating at high temperature cannot be obtained.

The establishment of the above-described amount of residual carbon can be easily made by properly selecting the type of the thermosetting resin or the types of the thermosetting resin and a hardening agent, or further by properly selecting the types and amounts of additives. It is particularly preferred that the amount of residual carbon is in the range of from about 1.0 to 10% by weight.

It is desirable that the fixing composition of this invention has a pressure-sensitive adhesive property but it is not an inevitable factor in this invention. In this case, by applying, if necessary, a heat energy to the composition when interposing the composition between the metal powder molding and the metal case material, the temporary adhesion of the composition can be easily practiced.

Then, the method of using the fixing composition at sintering of this invention is explained. First, in the case of disposing a metal powder molding formed by rolling a mixture of a metal powder and a synthetic resin-based binder on a metal base material, the fixing composition of this invention is interposed between the metal base material and the metal powder molding. The interposition of the composition may be performed by previously forming a sheet of the composition or by coating at least one of the base material and the molding with the composition.

The thickness of the sheet of the composition or the coating thickness of the composition is generally from about 5 to 50 μm, preferably about 10 to 30 μm. If the thickness is too thin, the effect of this invention is not obtained and if the thickness is too thick, the generation of gas at the interface between the base material and the molding becomes severe to reduce the fixing strength at sintering and the bonding strength after sintering.

The metal powder molding used in the above method is formed by rolling a mixture of a metal powder and a synthetic resin-based binder into a sheet-like material or an analogous article thereof. In the case of using the composition as a sheet, the thickness of the sheet is usually from about 0.5 to 5 mm.

As the above-described metal powder, various metal powders such as a self-melting alloy powder and an abrasion resisting alloy powder can be used according to the property to be imparted to the surface of the metal base material. The representative example of the alloy powder is an Fe-M-C system eutectic alloy powder which is an abrasion resisting alloy powder, wherein M contains at least one of Mo, B and P as the main component. Furthermore, M may further contain Cr, V, W, Nb, Ta, or Ti as a secondary element and may contain other elements such as Si, Ni, Mn, etc. Such an eutectic alloy powder has the feature that the sintering temperature is relatively low, the liquid phase becomes generally from about 10 to 50% by volume in the temperature range of from about 1,000° to 1,150° C., and the liquid phase has an excellent wetting property for the metal base material.

In addition, it is preferred that the particle size of the alloy powder be generally about 150 Tyler mesh or less in view of the fact that the particle size influences on the porosity after sintering. If the particle size is larger than the above value, it is difficult to form an alloy layer having a high density.

As the synthetic resin-based binder to be mixed with the above-described metal powder, a binder having a pressure-sensitive adhesive property is preferred. In particular, an acrylic polymer or copolymer composed of a (meth)acrylic alkyl ester or composed of the ester and a monomer copolymerizable therewith and an acrylic pressure-sensitive adhesive composition composed of the acrylic polymer or copolymer containing added thereto an adhesive property imparting resin such as an alkylphenolic resin, a rosin resin, a petroleum resin, a cumarone-indene resin, etc., are preferably used.

The above-described synthetic resin-based binder is diluted with a proper organic solvent such as acetone, toluene, methyl ethyl ketone, etc., the solution is kneaded with from about 10 to 100 parts by weight of the metal powder per 1 part by weight of the solid component thereof, the kneaded mixture is poured on a frame having thereon a mold release paper and after evaporating the solvent, the mixture is molded into a sheet form or the like by passing it through molding rolls to provide a desired metal powder molding.

The metal powder molding is placed on a metal base material with the fixing composition of this invention interposed between them as described above and is sintered in a non-oxidizing atmosphere. In this case, the temperature raising rate may be constant and it is unnecessary to maintain the system at a lower temperature side for a definite period of time at sintering as the previous proposal. In the initial temperature raising stage, the solvent in the composition is first hardened to show a strong adhesive force and then converted into a carbon precursor which effectively contributes to the adhesion, the carbon precursor further contributing to stably adhere and fix the molding onto the base material until the temperature reaches the sintering temperature.

The reason why the sintering processing is carried out under a non-oxidizing atmosphere is apparent. Namely, a desired alloy layer cannot be formed in an oxidizing atmosphere, because the molding is oxidized to cause deterioration during the processing. The non-oxidizing atmosphere includes not only hydrogen gas atmosphere and nitrogen gas atmosphere but also vacuum, etc.

When the temperature of the system is increased to the sintering temperature as described above and then the system is maintained at the sintering temperature for a definite period of time, the carbon precursor is finally completely carbonized. In this case, the amount of residual carbon is at least about 0.5% by weight as described above. Also, similar materials in the metal powder molding are carbonized and vanished. On the other hand, the metal component in the molding diffuses in the base material to form a metal layer strongly bonded to the base material.

The invention is described in more detail by reference to the following examples. Unless otherwise indicated, all parts and percentages are by weight.

EXAMPLE 1

A mixture of 75 parts of a bisphenol A type liquid epoxy resin (epoxy equivalent: 184 to 194), 25 parts of a bisphenol A type solid epoxy resin (epoxy equivalent: 600 to 700), and 60 parts of acetone was mixed, and 5 parts of dicyandiamide and 2 parts of dichlorophenyldimethylurea were further added thereto to form a solution as a fixing composition of this invention. The solution was coated on a mold release paper and dried to form a sheet having a thickness of 20 μm. The amount of residual carbon when the sheet was subjected to a carbonization treatment under the same condition as the subsequent sintering treatment was 7%.

On the other hand, after wet-kneading 48.5% of an eutectic alloy powder composed of 10.5% Mo, 2.5% Cr, 2.4% P and 3.6% C, rest being Fe and having a particle size of 150 Tyler mesh or less, 48.5% of a SUS 410 powder having a particle size of 150 Tyler mesh or less, and further 3% of (meth)acrylic acid alkyl ester resin using acetone as a solvent, the kneaded mixture was rolled to form an alloy powder sheet having a thickness of 2 mm and a density of 4.8 g/cm³.

The sheet thus formed was cut into a size of 1 cm×1 cm and after sticking the above sheet of the fixing composition cut into the same size to the alloy powder sheet, the sheet was stuck to a vertical surface of a steel base material. Thereafter, the temperature of the system was increased to 1,090° C. at a rate of 15°/min. in a hydrogen gas atmosphere and after maintaining the system at the temperature for 20 minutes, the system was gradually cooled.

Thus, an abrasion resisting alloy layer having a thickness of 1.6 to 1.65 mm, a hardness of 62 to 65 in HRC, and a density of 7.6 to 7.75 g/cm³ and strongly bonded to the steel base material could be formed without causing falling of the metal powder sheet during the sintering treatment.

EXAMPLE 2

| | |
|---|---|
| Bisphenol A type liquid epoxy resin (epoxy equivalent: 184 to 194) | 80 parts |
| Bisphenol A type solid epoxy resin (epoxy equivalent: 600 to 700) | 20 parts |
| Acetone | 50 parts |
| Dicyandiamide | 5 parts |
| Dichlorophenyldimethylurea | 2 parts |

A fixing composition of this invention was formed by mixing the above-described components in the same manner as in Example 1 and coated on a mold release paper and dried to form a sheet having a thickness of 30 μm. The amount of residual carbon when the sheet was subjected to a carbonization treatment under the same condition as the subsequent sintering treatment was 8%.

On the other hand, after wet-kneading 58.8% of the eutectic alloy powder as used in Example 1, 39.2% of a SUS 410 powder having a particle size of 150 Tyler mesh or less, and 2% of a (meth)acrylic acid alkyl ester using toluene as a solvent, the kneaded mixture was rolled to provide an alloy powder sheet having a thickness of 1 mm and a density of 4.65 g/cm³.

The sheet thus formed was cut into a size of 1 cm×1 cm and after sticking the above sheet of the fixing composition cut into the same size to the alloy powder sheet, the sheet was stuck to a vertical surface of a metal base material. Thereafter, the temperature of the system was increased to 1,080° C. at a rate of 20° C./min. in a hydrogen gas atmosphere, and after maintaining the system at the temperature for 15 minutes, the system was gradually cooled.

Thus, an abrasion resisting alloy layer having a thickness of 0.8 to 0.82 mm, a hardness of 61 to 63 in HRC, and a density of 7.6 to 7.7 g/cm³ and strongly bonded to the steel base material could be formed without causing falling of the alloy powder metal during the sintering treatment.

EXAMPLE 3

A fixing composition of this invention was prepared by mixing 100 parts of an unsaturated polyester resin (a mixture of 70% unsaturated polyester resin having an acid value of 19 to 25 and 30% of styrene) and 1 part of dibenzoyl peroxide and was coated on a mold release paper to prvide a sheet having a thickness of 20 μm. The amount of residual carbon when the sheet was subjected to a carbonization treatment under the same condition as the sintering treatment explained after was 7%.

On the other hand, after wet-kneading 38.6% of the same eutectic alloy powder as used in Example 1, 57.9% of a SUS 410 powder having a particle size of 150 Tyler mesh or less, and 3.5% of a (meth)acrylic acid alkyl ester resin using toluene as a solvent, the kneaded mixture was rolled to form an alloy powder sheet having a thickness of 1.5 mm and a density of 4.8 g/cm³.

The sheet was cut into a size of 1 cm×1 cm and after sticking the sheet of the above fixing composition cut into the same size to the alloy powder sheet, the sheet was stuck to a vertical surface of a steel base material. Thereafter, the temperature of the system was increased to 1,100° C. at a rate of 10° C./min. in a hydrogen gas atmosphere and after maintaining the system at the temperature for 20 minutes, the system was gradually cooled.

Thus, an abrasion resisting alloy layer having a thickness of 1.3 to 1.35 mm, a hardness of 60 to 62 in HRC, and a density of 7.5 to 7.7 g/cm³ could be formed without causing falling of the alloy powder sheet during the sintering treatment.

While the invention has been described in detail and with reference to specific embodiments thereof, it will be apparent to one skilled in the art that various changes and modifications can be made therein without departing from the spirit and scope thereof.

What is claimed is:

1. A process for sintering comprising the steps of providing a fixing composition layer comprising a thermosetting resin capable of providing an amount of residual carbon after sintering of at least 0.5% by weight on a metal base material, providing a metal powder molding composition comprising a mixture of a metal powder and a synthetic resin-based binder on the fixing composition layer and sintering the metal powder molding in a non-oxidizing atmosphere.

2. The process as claimed in claim 1, wherein the thermosetting resin is an epoxy resin.

3. The process as claimed in claim 2, wherein the epoxy resin is a bisphenol A type epoxy resin having an epoxy equivalent of 100 to 5,000.

4. The process as claimed in claim 1, wherein the fixing composition layer further contains a hardening agent for the thermosetting resin.

5. The process as claimed in claim 1, wherein the amount of residual carbon is from about 1.0 to 10% by weight.

* * * * *